US011286005B2

(12) United States Patent
Hahnlen et al.

(10) Patent No.: US 11,286,005 B2
(45) Date of Patent: Mar. 29, 2022

(54) HOOD FRAME REINFORCEMENT FOR DEFLECTION MITIGATION

(71) Applicant: HONDA MOTOR CO., LTD., Tokyo (JP)

(72) Inventors: Ryan M. Hahnlen, Dublin, OH (US); Amitkumar Patil, Marysville, OH (US); Tyler J. Rupp, Radnor, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 148 days.

(21) Appl. No.: 16/559,268

(22) Filed: Sep. 3, 2019

(65) Prior Publication Data

US 2021/0061367 A1    Mar. 4, 2021

(51) Int. Cl.
| | |
|---|---|
| *B62D 25/10* | (2006.01) |
| *B62D 25/12* | (2006.01) |
| *B21D 53/88* | (2006.01) |
| *B23K 26/21* | (2014.01) |
| *B21D 22/02* | (2006.01) |
| *B23P 23/06* | (2006.01) |
| *B23K 101/00* | (2006.01) |

(52) U.S. Cl.
CPC ............. *B62D 25/12* (2013.01); *B21D 22/02* (2013.01); *B21D 53/88* (2013.01); *B23K 26/21* (2015.10); *B23P 23/06* (2013.01); *B23K 2101/006* (2018.08); *B23P 2700/50* (2013.01); *B62D 25/105* (2013.01)

(58) Field of Classification Search
CPC ...... B62D 25/10; B62D 25/105; B62D 25/12; B62D 29/001

USPC ...................................................... 296/193.11
See application file for complete search history.

(56) References Cited

U.S. PATENT DOCUMENTS

| | | | |
|---|---|---|---|
| 5,833,024 A | * | 11/1998 | Kaneko ................ B62D 25/105 180/69.2 |
| 7,631,928 B2 | | 12/2009 | Ackland et al. |
| 8,114,239 B2 | | 2/2012 | Fernholz et al. |
| 9,902,481 B2 | | 2/2018 | Hoetzeldt |

(Continued)

FOREIGN PATENT DOCUMENTS

| | | |
|---|---|---|
| CN | 109501870 A | 3/2019 |
| DE | 10064345 A1 | 6/2002 |

(Continued)

OTHER PUBLICATIONS

Chapter 7: Case Study: Polymer Matrix Composites in Automobiles, Advanced Materials by Design, (Accessed Apr. 5, 2019), (32 Pages Total).

(Continued)

*Primary Examiner* — Gregory A Blankenship
(74) *Attorney, Agent, or Firm* — Arent Fox LLP (57) ABSTRACT

A vehicle hood includes a unitary metallic hood frame including a plurality of embosses having respective curved surfaces and a plurality of openings. The vehicle hood includes a metallic reinforcement material welded to a subset of the respective curved surfaces of the metallic hood frame. The vehicle hood includes a hood skin attached to the hood frame. The selective placement of metallic reinforcement material may reduce deflection of the vehicle hood while reducing weight compared to metal supports or a thicker metallic hood frame.

20 Claims, 6 Drawing Sheets

(56) References Cited

U.S. PATENT DOCUMENTS

| | | | |
|---|---|---|---|
| 2002/0003054 A1* | 1/2002 | Kamada | B21D 35/007 |
| | | | 180/69.2 |
| 2003/0118806 A1 | 6/2003 | Schonebeck | |
| 2006/0163915 A1* | 7/2006 | Ikeda | B60R 21/34 |
| | | | 296/193.11 |
| 2009/0195031 A1* | 8/2009 | Ishitobi | B62D 25/105 |
| | | | 296/193.11 |
| 2009/0230728 A1* | 9/2009 | Kleber | B62D 25/12 |
| | | | 296/191 |
| 2011/0169303 A1* | 7/2011 | Ikeda | B60R 21/34 |
| | | | 296/193.11 |
| 2014/0015285 A1* | 1/2014 | Ishitobi | B62D 25/105 |
| | | | 296/193.11 |
| 2014/0062142 A1* | 3/2014 | Ikeda | B62D 25/12 |
| | | | 296/193.11 |
| 2015/0069786 A1* | 3/2015 | Benson | B62D 25/105 |
| | | | 296/187.09 |
| 2015/0307135 A1* | 10/2015 | Lindmark | B62D 25/12 |
| | | | 296/191 |
| 2015/0329147 A1* | 11/2015 | Iwano | B60R 21/34 |
| | | | 296/193.11 |
| 2015/0360728 A1* | 12/2015 | Hammer | B60R 21/34 |
| | | | 296/187.13 |
| 2016/0083019 A1* | 3/2016 | Takada | B60R 21/34 |
| | | | 296/193.11 |
| 2016/0152280 A1* | 6/2016 | Inoue | B62D 25/12 |
| | | | 296/193.11 |
| 2016/0152283 A1* | 6/2016 | Guha | B29C 66/7212 |
| | | | 428/213 |
| 2016/0201169 A1* | 7/2016 | Vecchio | C22C 1/0491 |
| | | | 420/580 |
| 2016/0208476 A1* | 7/2016 | Wadley | C22C 38/40 |
| 2016/0339966 A1* | 11/2016 | Iwase | F16B 19/05 |
| 2017/0090515 A1* | 3/2017 | Stevick | D03D 15/00 |
| 2017/0225720 A1* | 8/2017 | Sanders | B21D 53/88 |
| 2017/0241191 A1* | 8/2017 | Farooq | B62D 29/04 |
| 2017/0282977 A1* | 10/2017 | Kashima | B60R 21/34 |
| 2017/0282978 A1* | 10/2017 | Yoshida | B62D 27/026 |
| 2017/0291253 A1 | 10/2017 | Hahnlen et al. | |
| 2018/0072262 A1* | 3/2018 | Nakasako | B60R 21/34 |
| 2019/0315305 A1* | 10/2019 | Hammer | B62D 25/105 |
| 2020/0307713 A1* | 10/2020 | Nishino | B62D 25/10 |
| 2020/0361539 A1* | 11/2020 | Muhammad | B32B 7/08 |
| 2020/0391805 A1* | 12/2020 | Kashima | B62D 25/105 |
| 2021/0031838 A1* | 2/2021 | Nagy | B62D 25/12 |
| 2021/0061367 A1* | 3/2021 | Hahnlen | B23K 26/21 |
| 2021/0347414 A1* | 11/2021 | Winkler | B60R 21/34 |

FOREIGN PATENT DOCUMENTS

| | | |
|---|---|---|
| DE | 102004047512 A1 | 3/2006 |
| DE | 102010025877 A1 | 1/2012 |

OTHER PUBLICATIONS

D. Costi et al., "Optimization Methodology for an Automotive Hood Substructure (Inner Panel)", Proceedings of the World Congress on Engineering 2011 vol. III, WCE 2011, Jul. 6-8, 2011, London, U.K., (4 Pages Total).

Dae-Young Kwak et al., "Optimal design of composite hood with reinforcing ribs through stiffness analysis", Composite Structures, vol. 38, No. 1-4, pp. 351-359, 1997.

F. Balle et al., "Ultrasonic spot welding of aluminum sheet/carbon fiber reinforced polymer—joints", Mat.-wiss. u. Werkstofftech. 2007, 38, No. 11, pp. 934-938, DOI: 10.1002/mawe.200700212.

Stephen Moore., "Continuous-fiber-reinforced thermoplastic composite displays potential as tool for localized reinforcement", Plastics Today, Community for Plastics Professionals, (5 Pages Total), Oct. 29, 2017.

* cited by examiner

HOOD FRAME REINFORCEMENT FOR DEFLECTION MITIGATION

BACKGROUND

Traditional vehicle hoods include a metal frame component. The metal frame component provides structural support to a relatively flat hood outer skin/panel and helps the vehicle hood maintain its shape. Metal frame components for a vehicle hood may be subject to various forces during operation of the vehicle, as well as to design constraints related to energy management in the event of a collision, for example. A vehicle hood may experience deflection due to lift caused by airflow over the vehicle hood and due to thermal expansion.

In view of the foregoing, there is a need for improved vehicle hood frame components. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides a vehicle hood. The vehicle hood may include a unitary metallic hood frame including a plurality of embosses having respective curved surfaces and a plurality of openings. The vehicle hood may include a metallic reinforcement material welded to a subset of the respective curved surfaces of the metallic hood frame. The vehicle hood may include a hood skin attached to the hood frame.

In another aspect, the disclosure provides a method of manufacturing a vehicle hood. The method may include welding a metallic reinforcement material to portions of a metallic blank to form a hood frame blank. The method may include stamping the hood frame blank to form a hood frame including a plurality of embosses having respective curved surfaces and a plurality of openings, wherein the portions of the metallic blank having the welded metallic reinforcement material form a subset of the respective curved surfaces of the plurality of embosses. The method may include attaching a hood skin to the hood frame.

In another aspect, the disclosure provides a vehicle. The vehicle may include a source of kinetic energy such as an engine or motor. The vehicle may include at least two wheels coupled to the source of kinetic energy via a transmission. The vehicle may include a hood covering the source of kinetic energy. The hood may include a unitary metallic hood frame including a plurality of embosses having respective curved surfaces and a plurality of openings. The hood may include a metallic reinforcement material welded to a subset of the respective curved surfaces of the metallic hood frame. The hood may include a hood skin attached to the hood frame.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to any manned or unmanned structure capable of moving and is powered by any form of energy. The term "vehicle" includes, but is not limited to: cars, trucks, vans, minivans, SUVs, motorcycles, scooters, boats, personal watercraft, submersibles, aircraft, and spacecraft. In some cases, a motor vehicle includes one or more engines.

It should be understood that the description and drawings herein are merely illustrative and that various modifications and changes can be made in the structures disclosed without departing from the present disclosure. In general, the figures of the example vehicle hood structure are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the example vehicle hood structure disclosed herein are merely terms of art that may vary from one manufacturer to another and should not be deemed to limit the present disclosure.

A vehicle hood may be subject to various forces during operation of the vehicle. For example, an airflow over the vehicle hood may cause lift on the vehicle hood that may deflect the hood from an original shape. As another example, heat from the engine may cause thermal expansion of a portion of the hood and cause similar deflections, particularly in hoods formed from a material with a high coefficient of thermal expansion (e.g., aluminum). Vehicle hoods may be subject to constraints that limit the rigidity of the hood. For example, a vehicle hood may be designed to crumple or fold in the event of a collision to manage energy absorption. Such constraints, however, may limit designs to address the deflection issues above.

Generally described, the present disclosure provides for a vehicle hood that is reinforced with a metallic reinforcement material. The metallic reinforcement material may be welded to a hood frame at one or more locations to form a bond across substantially an entire contact surface between the metallic reinforcement material and the hood frame. In an aspect, the welding may be performed on a metal hood blank prior to forming the hood frame. The metal hood blank including the metallic reinforcement material may be stamped to form the hood frame. A hood skin may be attached to the hood frame, for example, by adhesives and/or hemming an edge of the hood skin to the hood frame.

Figure 1:
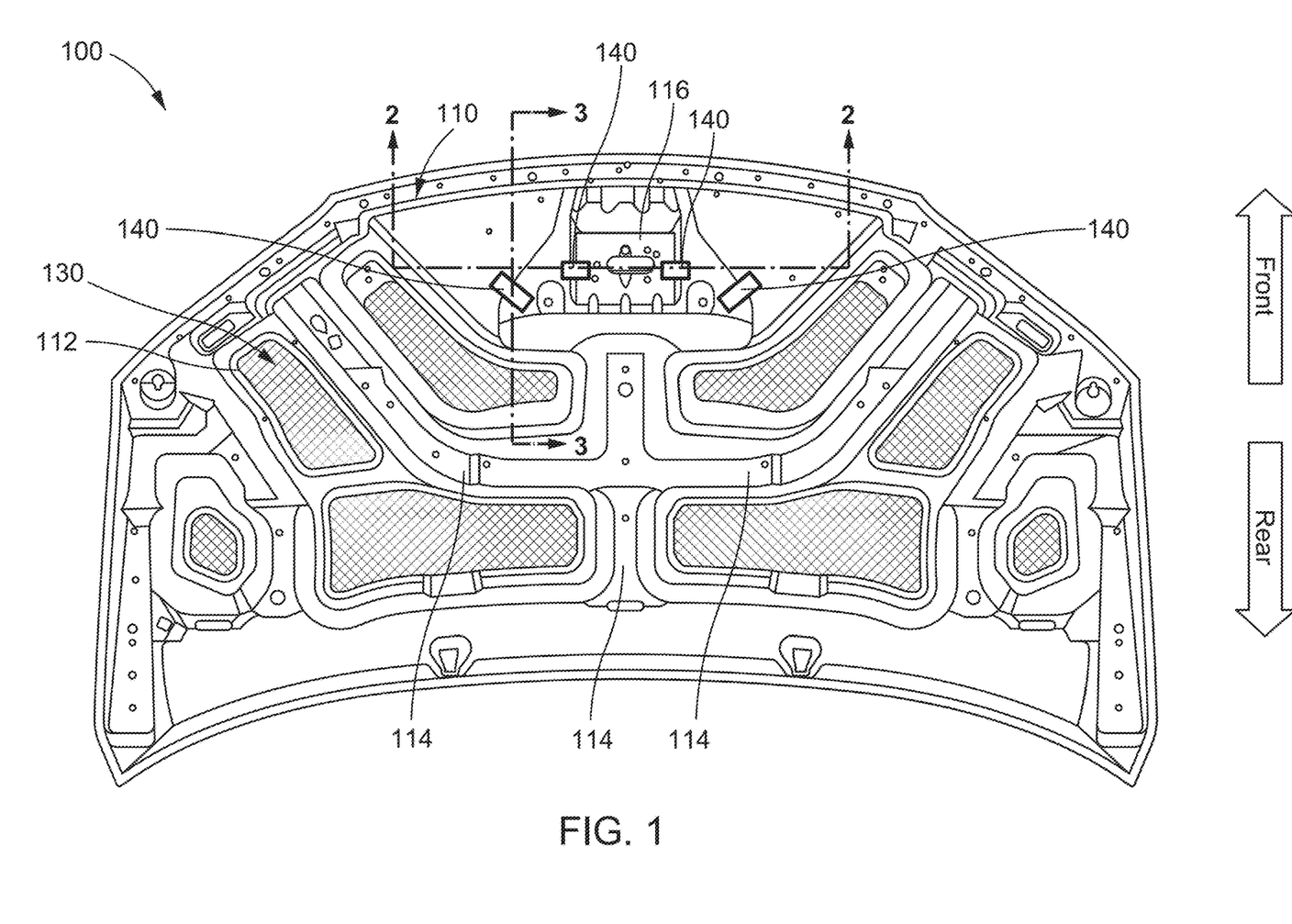
FIG. 1 is a bottom view of an example vehicle hood, according to an aspect of the disclosure.

Turning to the figures, where like reference numbers refer to like components, FIG. 1 illustrates an example vehicle hood 100, which may include a metal hood frame 110, a hood skin 130, and one or more metallic reinforcements 140. In this view, the hood skin 130 may be seen through various openings 112 in the metal hood frame 110. The metal hood frame 110 may be a unitary structure stamped from a metal blank. The stamping may create a plurality of embosses 114, where the metal has a convex surface when viewed from the bottom. Conversely, the opposite surface of the bosses 114 that faces the hood skin 130 may be concave. The reinforcements 140 may be located on a subset of the surfaces. For example, the reinforcements 140 may be located on either the convex surface facing away from the hood skin 130 or on the concave surface facing toward the hood skin 130. By selectively reinforcing the hood frame 110, the reinforcements 140 may improve rigidity to prevent deflection while minimizing impact on energy management and increased weight.

It should be appreciated that variations of the embosses 114 and openings 112 of the illustrated example vehicle hood 100 may designed by a person of ordinary skill in the art while remaining within the scope of the present disclosure. For example, the illustrated example vehicle hood frame 110 includes interconnected embosses 114, but a vehicle hood frame may include isolated embosses 114. As schematically shown in FIG. 1, the hood frame 110 may include a central longitudinal emboss 114 that extends from a front edge of the hood 100 to a rear edge of the hood 100. The central longitudinal emboss 114 may include multiple sections. In an aspect, the central longitudinal boss 114 may include a striker pocket 116 that houses a striker for engagement with a locking mechanism. The striker pocket 116 may also house a portion of the locking mechanism and/or a release mechanism. In an aspect, one or more reinforcements 140 may be located on or near the striker pocket 116. In other examples, a hood frame may include two or more striker pockets, and any of such striker pockets may be reinforced with a reinforcement 140. The hood frame 110 may include one or more lateral embosses. For example a rearmost emboss may extend along a rear edge of the hood frame 110. Openings 112 may be located in regions where structural support is not needed. The openings 112 may reduce the weight of the hood frame 110 and may also be referred to as cutouts or lightening holes. The openings 112 may also facilitate crumpling or bending for energy management in the event of a collision.

Figure 2:
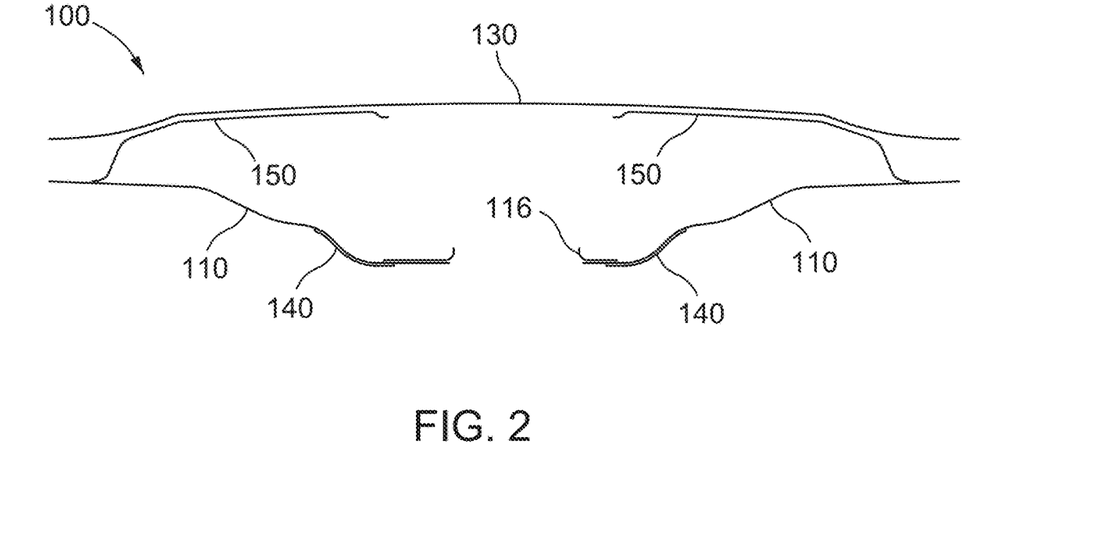
FIG. 2 is a lateral cross section of the example vehicle hood of FIG. 1, according to an aspect of the disclosure.

FIG. 2 is a lateral cross-section along the line 2-2 in FIG. 1 with the vehicle hood 100 oriented with the hood skin 130 up. The reinforcements 140 are curved along with the hood frame 110. In an aspect, the reinforcements 140 may be bonded with the hood frame 110 across substantially an entire surface of the metallic reinforcement material of the reinforcements 140. As discussed in further detail below, the reinforcements 140 may be welded to the hood frame 110 before stamping to create the bond across substantially the entire surface of the reinforcements 140.

In an aspect, the vehicle hood 100 may include a hood skin stiffener 150 between the hood frame 110 and the hood skin 130. In particular, in areas where the hood frame 110 is particularly deep (e.g., near the striker pocket 116), hood skin stiffeners 150 may be added to prevent the hood skin 130 from deflecting. For example, a hood skin stiffener 150 may be a stamped metal support that is welded to the hood frame 110. The hood skin stiffener 150 may be attached to the hood skin 130 via an adhesive.

Figure 3:
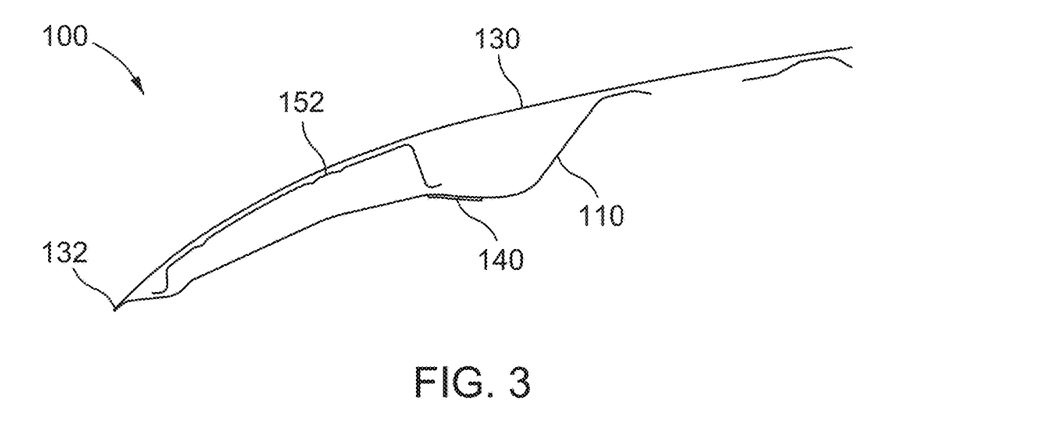
FIG. 3 is a longitudinal cross section of the example vehicle hood of FIG. 1, according to an aspect of the disclosure.

FIG. 3 is a longitudinal cross-section along the line 3-3 in FIG. 1 with the vehicle hood 100 oriented with the hood skin 130 up. In this example, the reinforcement 140 may be located along a convex surface of the hood frame 110. A hood skin stiffener 152 may be located between the hood skin 130 and the hood frame 110 to support a shape of the hood skin 130 near a front edge 132. The front edge 132 of the hood skin 130 may be hemmed to a front edge of the hood frame 110. In an aspect, the hood skin stiffener 152 may be welded to the hood frame 110 on a surface opposite the reinforcement 140. For example, if arc welding is used, the reinforcement 140 may conduct electricity if needed. In other example implementations, the hood skin stiffener 152 may be offset from the reinforcement 140 to avoid a weld near the reinforcement 140.

Figure 4:
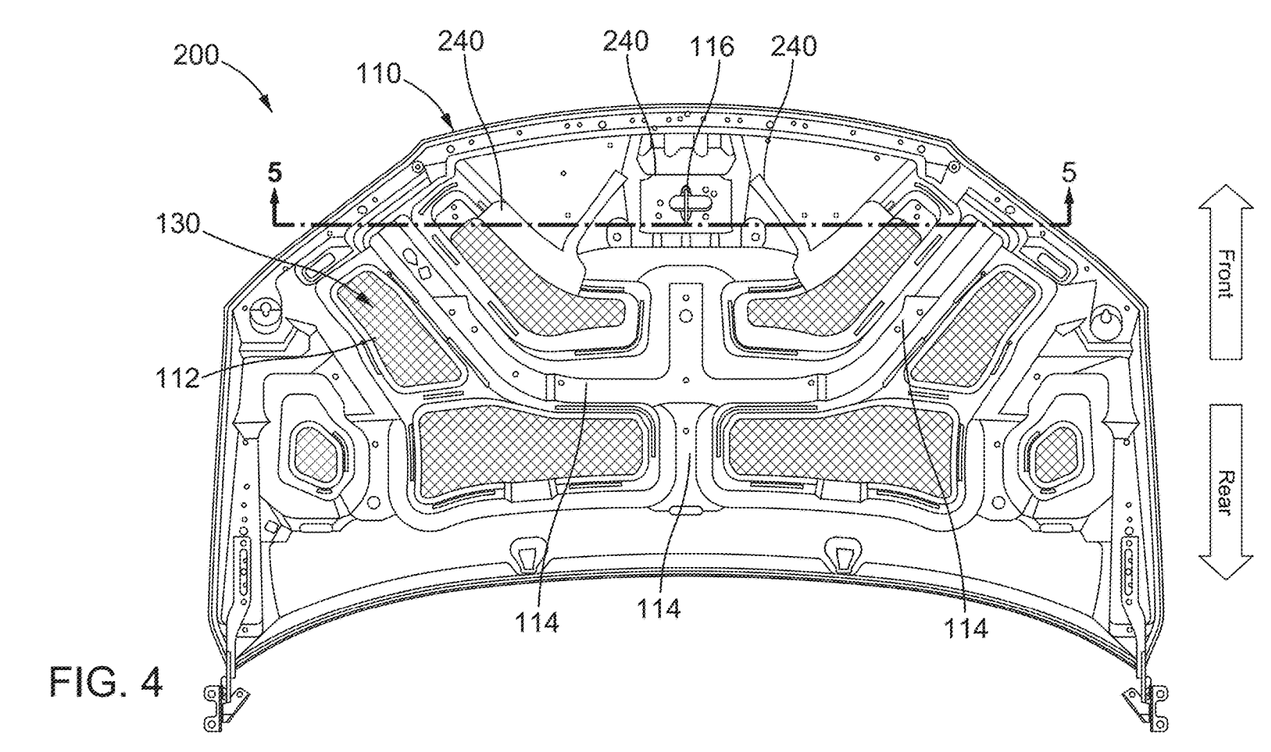
FIG. 4 is a bottom view of a second example vehicle hood, according to an aspect of the disclosure.

FIG. 4 is a illustrates a second example vehicle hood 200, which may be similar to the example vehicle hood 100, but include one or more metallic reinforcements 240 in different locations. Once again, the hood skin 130 may be seen through various openings 112 in the metal hood frame 110. The metal hood frame 110 may be a unitary structure stamped from a metal blank. The stamping may create a plurality of embosses 114, where the metal has a convex surface when viewed from the bottom. Conversely, the opposite surface of the embosses 114 that faces the hood skin 130 may be concave.

The reinforcements 240 may be located on a subset of the curved surfaces. By selectively reinforcing the hood frame 110, the reinforcements 140 may improve rigidity to prevent deflection while minimizing impact on energy management and increased weight. For example, a reinforcement 240 may be located around the striker pocket 116. In contrast to the first example vehicle hood 100, the reinforcement 240 may completely surround an opening for the striker. Another reinforcement 240 may be located on a lateral emboss adjacent a forward most opening of the plurality openings. The reinforcement 240 may also extend along a curved surface defining an outer edge of the striker pocket 116. Another location for reinforcements 240 may be a rearmost lateral emboss adjacent a rearmost opening of the plurality of openings.

Figure 5:
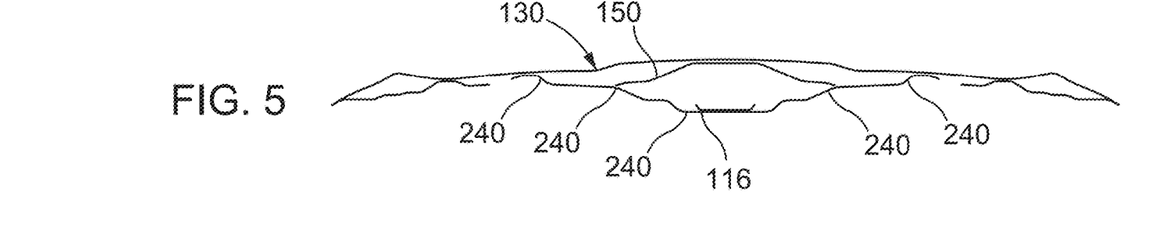
FIG. 5 is a lateral cross section of the example vehicle hood of FIG. 4, according to an aspect of the disclosure.

FIG. 5 illustrates a lateral cross section of the second example vehicle hood 200 of FIG. 4 along the line 5-5. The curvature of the reinforcements 240 is shown. The reinforcements 240 may have convex curvature, concave curvature, or both. As discussed in further detail below, the curvature of the reinforcements 240 may be created during a stamping process that shapes the hood frame 110 and the reinforcements 240.

Figure 6:
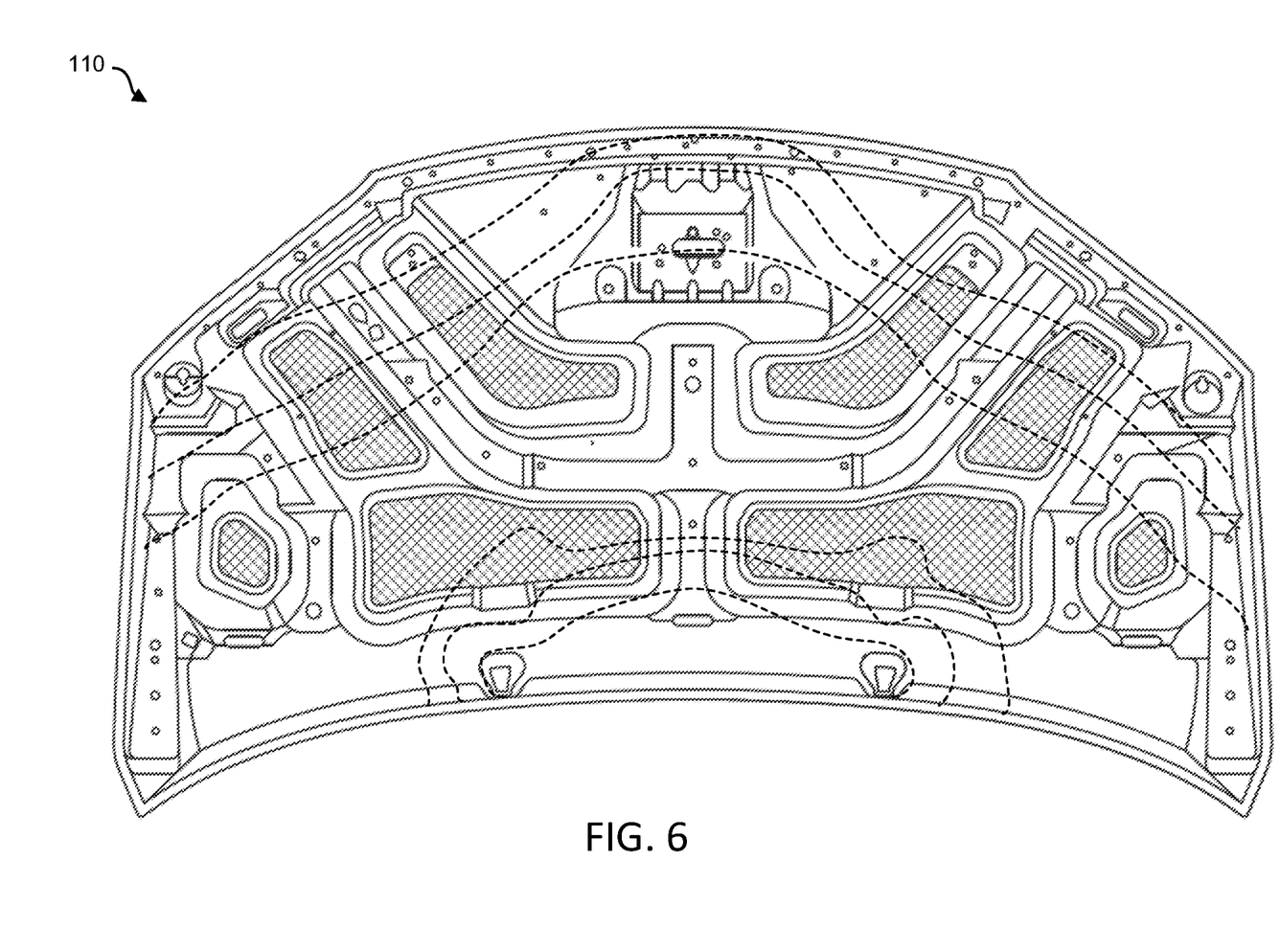
FIG. 6 is a diagram showing deflection of an example vehicle hood without reinforcements.
Figure 7:
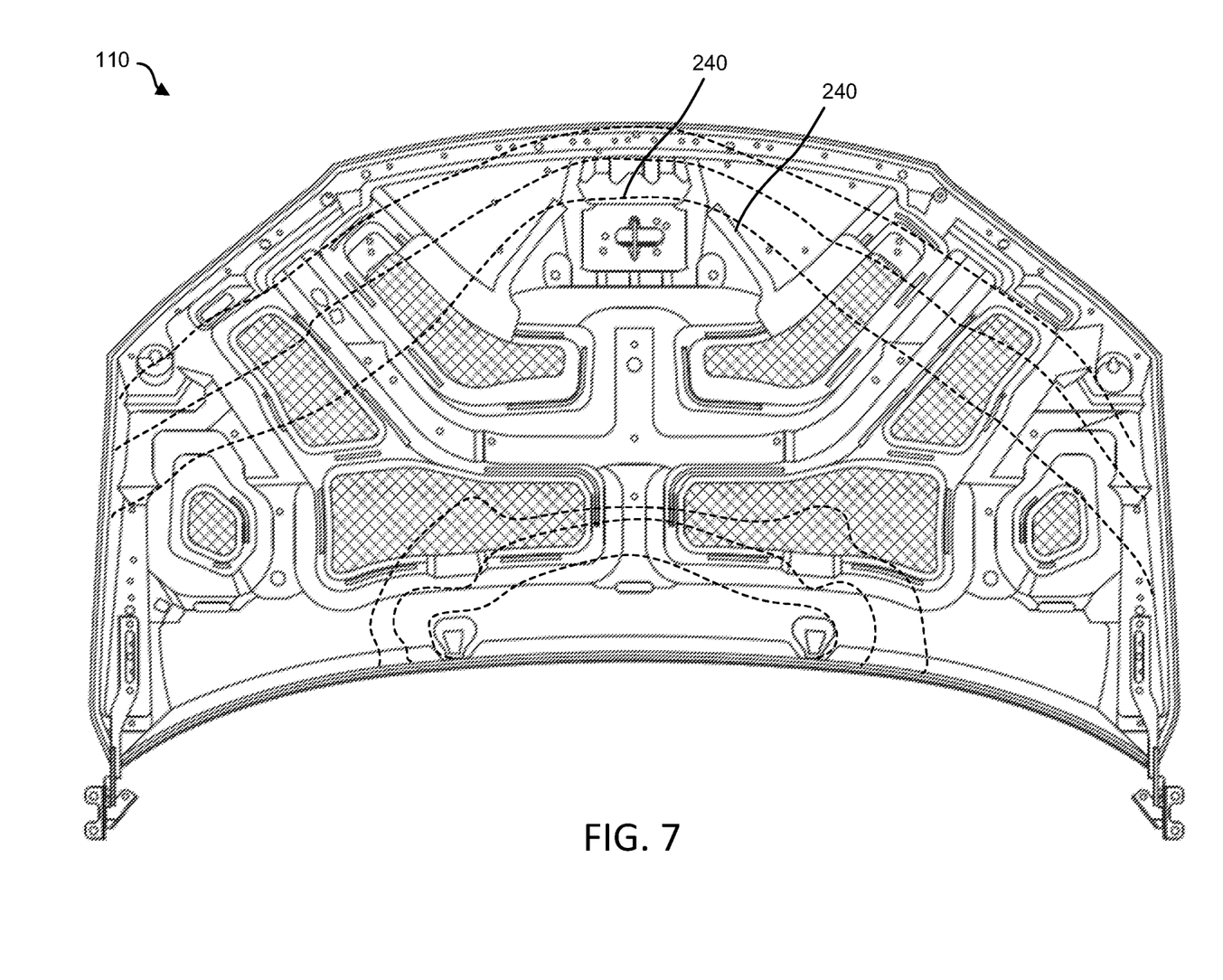
FIG. 7 is a diagram showing deflection of an example vehicle hood with reinforcements, according to an aspect of the disclosure.

In an aspect, computer modeling may be used to determine locations for reinforcements 140, 240 for various hood designs. For example, an optimization tool such as Abaqus Software's Tosca sizing tool from Dassault Systems SIMULIA Corp. of Johnston, R.I. may be used to model effects of loads on an example hood 100 or hood frame 110. Locations may be selected that meet a desired objective such as reducing deflection at a perimeter of the hood under load conditions. FIGS. 6 and 7 are contour maps showing simulated deflections of the example hood frame 110 under a set of load conditions including aerodynamic load, thermal load, and user operation loads. In particular, the dashed lines in FIG. 6 represent contours of simulated deflection of the hood frame 110 without any reinforcements and the dashed lines in FIG. 7 represent contours of simulated deflection of the hood frame 110 including the illustrated reinforcements 240. The mass of the illustrated reinforcements 240 may be approximately 0.20 kg. As illustrated, there is less deflection along the front perimeter of the hood frame 110 with the reinforcements 240. Additionally, the maximum deflection is decreased by approximately 0.27 mm, which is a 18% decrease. Further, the natural frequency of the hood frame 110 with the reinforcements 240 may be increased, showing a general improvement in rigidity.

Figure 8:
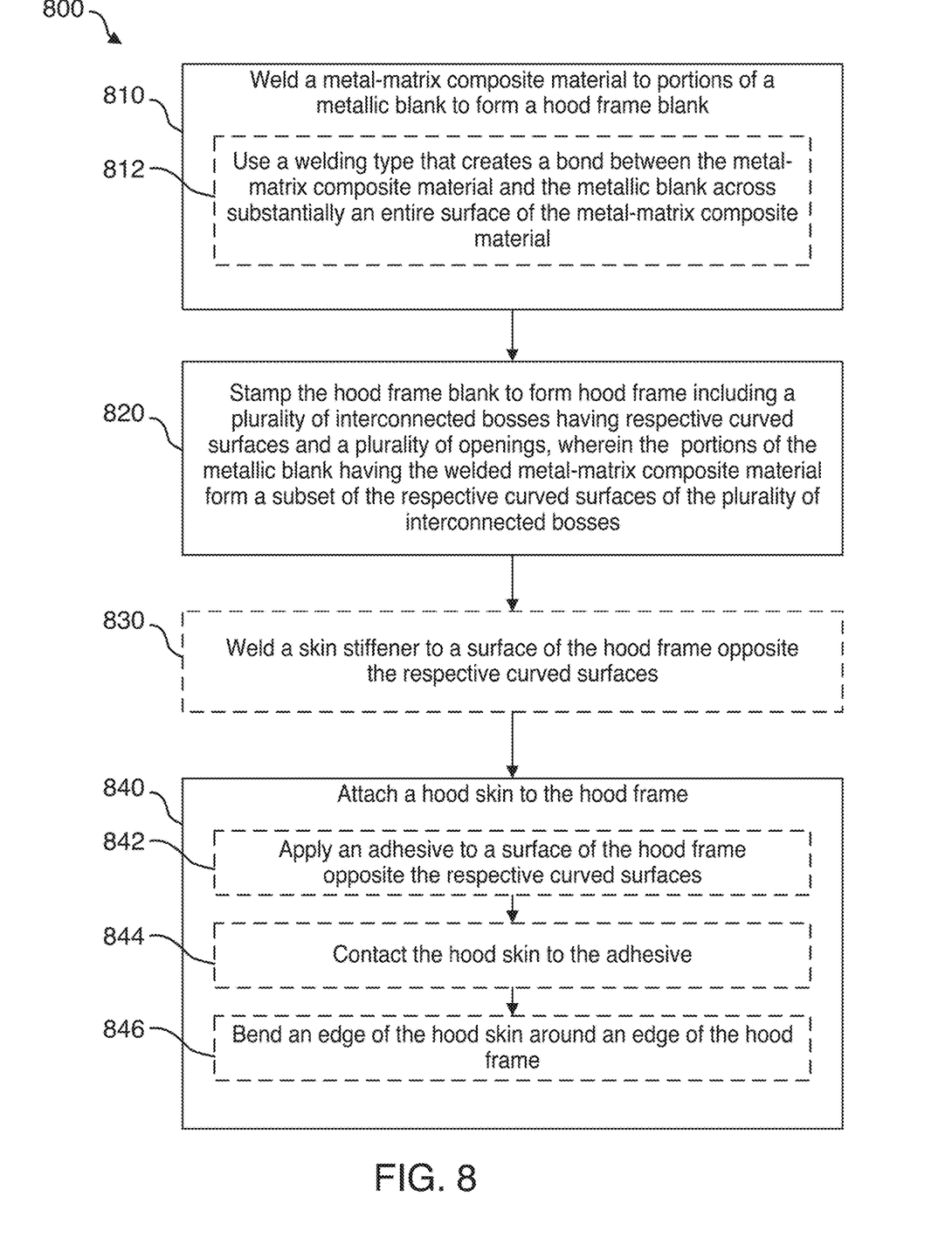
FIG. 8 is a flowchart illustrating an example method of manufacturing a vehicle hood, according to an aspect of the disclosure.

FIG. 8 is a flowchart illustrating an example method 800 of manufacturing a vehicle hood. The vehicle hood may include a hood frame 110, a hood skin 130, and one or more reinforcements 140, 240. The method 800 may be performed by an operator using equipment including an ultrasonic welding machine and other manufacturing tools and apparatuses known in the art. Although the method 800 is described below with respect to actions performed by an operator, one or more of the steps described herein may be automated (e.g., performed by a robotic arm).

In block 810, the method 800 may include welding a metallic reinforcement material to portions of a metallic blank to form a hood frame blank. In an aspect for example, the operator may weld the metallic reinforcement material to the portions of the metallic blank to form the hood frame blank. Both the metallic reinforcement material and the metallic blank may be flat sheets. In an implementation, the metallic reinforcement material may be a metal-matrix composite such as a ceramic bearing metal-matrix composite. In another implementation, the metallic reinforcement material may be one of: AL/Alumina (aluminum oxide or AL2O3) metal-matrix composite, silicon carbine metal-matrix composite, carbon fiber metal-matrix composite, glass fiber metal-matrix composite, basalt fiber metal matrix composite discontinuously reinforced metal (DRX), bulk metallic glass (BMG), or high entropy alloy (HEA). Candidate materials for the metallic reinforcement include materials that have a relatively high specific stiffness, the ratio of an elastic modulus of the material to density, optionally greater than approximately 25 MN-m/kg, while being ductile enough to undergo the forming process to create the hood frame without fracturing. In an implementation, the metallic reinforcement material may be approximately 1.0-3.0 mm thick, preferably 1.5-2.0 mm thick. In another implementation, the metallic reinforcement composite material may be between 10% and 150% of a thickness of the metallic blank, preferably between 50% and 100% of the thickness of the metal blank. U.S. Patent Application Publication Number 2019/0047031 describes methods of adding a reinforcement to a metal blank prior to a forming process and is incorporated by reference herein.

The portions of the metallic blank may be selected to correspond to a subset of the respective curved surfaces of the finished hood frame 110 including reinforcements 140, 240. For example, the portions of the metallic blank may correspond the subset of the respective curved surfaces including one or more of: at least a portion of the centrally located striker pocket, a lateral emboss adjacent a forward most opening of the plurality openings, or a rearmost lateral rib adjacent a rearmost opening of the plurality of openings.

In sub-block 812, the block 810 may include using a welding type that creates a bond between the metallic reinforcement material and the metallic blank across substantially an entire surface of the metallic reinforcement material. For example, the welding type may include ultrasonic welding, ultrasonic additive manufacturing, diffusion welding, laser welding, solid-state welding, fusion welding, or a friction stir additive process. In an aspect, the welding types may be performed on the flat metallic blank and the flat metallic reinforcement material, but may be difficult to perform on curved surfaces. For example, for ultrasonic additive manufacturing, curved surfaces may result in other parts of the workpiece contacting and/or interfering with the sonotrode. The bond across the entire surface of metallic reinforcement material may be stronger than bonds (e.g., spots or beads) formed by other welding types.

In block 820, the method 800 may include stamping the hood frame blank to form a hood frame including a plurality of embosses having respective curved surfaces and a plurality of openings. The portions of the metallic blank having the welded metallic reinforcement material may form a subset of the respective curved surfaces of the plurality of embosses. In an implementation, the stamping may be performed with a die that is machined to accommodate the increased local thickness of the metallic blank at the reinforcements due to the metallic reinforcement material. The stamping process may draw the metal and metallic reinforcement material into the shape of the hood frame 110 including curved surfaces. The stamping process may leave the bond between the metal and the metallic reinforcement material intact, thereby created curved surfaces that are welded together.

In block 830, the method 800 may optionally include weld a skin stiffener to a surface of the hood frame opposite the respective curved surfaces. In an aspect, for example, the operator may weld the skin stiffener 150, 152 to a surface of the hood frame 110 opposite the respective curved surfaces. For example, the reinforcements 140, 240 may be welded to curved surfaces on a bottom side of the hood frame 110 (i.e., facing the engine/motor), and the skin stiffener 150, 152 may be welded to the top side of the hood frame (i.e., facing the bottom surface of the hood skin. As discussed above, the skin stiffeners 150, 152 may support certain parts of the hood skin 130 where the draw depth of the embosses 114 is spaced from the hood skin 130.

In block 840, the method 800 may include attaching a hood skin to the hood frame. In an aspect, for example, the operator may attach the hood skin to the hood frame. For example, at sub-block 842, the block 840 may optionally include applying an adhesive to a surface of the hood frame opposite the respective curved surfaces. Accordingly, the adhesive may be located between the hood skin 130 and the hood frame 110. At sub-block 844, the block 840 may optionally include contacting the hood skin to the adhesive. For example, the operator may position the hood skin 130 to contact the adhesive. In an alternative implementation, the adhesive may be applied to the hood skin 130 and brought into contact with the hood frame 110. At block 846, the block 840 may optionally include bending an edge of the hood skin around an edge of the hood frame. For example, the operator may bend an edge of the hood skin 130 around the edge of the hood frame 110. The bending may be referred to as hemming and may create a hemmed edge. In an aspect, for example, any external edge of the vehicle hood 100 may be hemmed.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A vehicle hood, comprising:
a unitary metallic hood frame including a plurality of embosses having respective curved surfaces and a plurality of openings;
a metallic reinforcement material welded to a subset of the respective curved surfaces of the metallic hood frame, wherein the metallic reinforcement material being welded to portions of the respective curved surfaces of the metallic hood frame includes a bond between the metallic reinforcement material and the respective curved surfaces of the metallic hood frame across substantially an entire surface of the metallic reinforcement material; and
a hood skin attached to the hood frame.

2. The vehicle hood of claim 1, further comprising a striker pocket configured to engage a locking mechanism, wherein the subset of the respective curved surfaces includes at least a portion of the striker pocket.

3. The vehicle hood of claim 1, wherein the subset of the respective curved surfaces includes a lateral emboss adjacent a forward most opening of the plurality openings.

4. The vehicle hood of claim 1, wherein the subset of the respective curved surfaces includes a rearmost lateral emboss adjacent a rearmost opening of the plurality of openings.

5. The vehicle hood of claim 1, wherein the metallic reinforcement material is a ceramic bearing metal-matrix composite.

6. The vehicle hood of claim 1, wherein the metallic reinforcement material is one of: AL/Alumina (aluminum oxide) metal-matrix composite, silicon carbine metal-matrix composite, carbon fiber metal-matrix composite, glass fiber metal-matrix composite, basalt fiber metal matrix composite, discontinuously reinforced metal (DRX), bulk metallic glass (BMG), or high entropy alloy (HEA).

7. The vehicle hood of claim 1, wherein the metallic reinforcement material is approximately 1.0-3.0 mm thick.

8. The vehicle hood of claim 1, wherein a thickness of the metallic reinforcement material is between 10% and 150% of a thickness of the unitary metallic hood frame.

9. The vehicle hood of claim 1, further comprising a skin stiffener welded to a surface of the unitary metallic hood frame opposite the respective curved surfaces.

10. The vehicle hood of claim 1, wherein the hood skin is attached to the unitary metallic hood frame via an adhesive and a hemmed edge of the hood skin.

11. A vehicle comprising:
a front body structure; and
a hood covering the front body structure, the hood comprising:
a unitary metallic hood frame including a plurality of embosses having respective curved surfaces and a plurality of openings;
a metallic reinforcement material welded to a subset of the respective curved surfaces of the metallic hood frame, wherein the metallic reinforcement material being welded to portions of the respective curved surfaces of the metallic hood frame includes a bond between the metallic reinforcement material and the respective curved surfaces of the metallic hood frame across substantially an entire surface of the metallic reinforcement material; and
a hood skin attached to the hood frame.

12. The vehicle of claim 11, wherein the hood comprises a striker pocket configured to engage a locking mechanism, wherein the subset of the respective curved surfaces includes at least a portion of the striker pocket.

13. The vehicle of claim 11, wherein the subset of the respective curved surfaces includes a lateral emboss adjacent a forward most opening of the plurality openings.

14. The vehicle of claim 11, wherein the subset of the respective curved surfaces includes a rearmost lateral emboss adjacent a rearmost opening of the plurality of openings.

15. The vehicle of claim 11, wherein the metallic reinforcement material is a ceramic bearing metal-matrix composite.

16. The vehicle of claim 11, wherein the metallic reinforcement material is one of: AL/Alumina (aluminum oxide) metal-matrix composite, silicon carbine metal-matrix composite, carbon fiber metal-matrix composite, glass fiber metal-matrix composite, basalt fiber metal matrix composite, discontinuously reinforced metal (DRX), bulk metallic glass (BMG), or high entropy alloy (HEA).

17. The vehicle of claim 11, wherein the metallic reinforcement material is approximately 1.0-3.0 mm thick.

18. The vehicle of claim 11, wherein a thickness of the metallic reinforcement material is between 10% and 150% of a thickness of the unitary metallic hood frame.

19. The vehicle of claim 11, further comprising a skin stiffener welded to a surface of the unitary metallic hood frame opposite the respective curved surfaces.

20. The vehicle of claim 11, wherein the hood skin is attached to the unitary metallic hood frame via an adhesive and a hemmed edge of the hood skin.

* * * * *